United States Patent Office 3,208,979
Patented Sept. 28, 1965

3,208,979
TREATMENT OF FLUOROCARBON ELASTOMER WITH ALKALI METAL SALT OF MALEIMIDE
Robert P. Conger, Park Ridge, and Paul R. Van Buskirk, Rutherford, N.J., assignors to United States Rubber Company, New York, N.Y., a corporation of New Jersey
No Drawing. Filed Nov. 30, 1961, Ser. No. 156,135
7 Claims. (Cl. 260—78)

This invention relates to the modification of fluorocarbon elastomers by replacement of a portion of the fluorine atoms by maleimido radicals, through the use of an alkali metal salt of maleimide.

The modified fluorocarbon elastomers of the invention are characterized by the ability to be cured or cross-linked by application of heat, to form valuable products.

The fluorocarbon elastomers to which the invention applies constitute a well known class of materials. They are substantially saturated, linear, high molecular weight, rubbery materials. They are highly fluorinated polymers of fluorinated compounds. The fluorinated compounds may contain other substituents besides fluorine, such as hydrogen, chlorine, bromine and nitroso. Such polymers include the elastomeric copolymers of vinylidene fluoride with other fluorinated comonomers such as hexafluoropropene (as in Viton A, A–HV, and B; Kel-F 2140; Fluorel), chlorotrifluoroethylene (as in Kel-F 3700 and 5500), and copolymers of nitrosotrifluoromethane with such fluorinated comonomers. For example, Honn et al., U.S. Patent 2,833,752, May 6, 1958, column 3, lines 36–55, list $CF_2=CHCl$
$CF_2=CClF$
$CF_2=CCl_2$
$CF_3-CF=CF_2$
$CF_2=CHCl$
$CF_3-CCl=CCl-CF_3$
$CF_2=CHF$
$CF_3-CH=CH-CF_3$
$CF_2=CF_2$
$CF_2=C-(CF_3)_2$
$CF_2=CFBr$
$CF_2=CCl-CF_3$
$CF_3-CH=CH_2$ and $CF_3CCl=CCl_2$ as highly fluorinated mono-olefins which may be copolymerized with the hydrogen-containing monoolefins $CF_2=CH_2$
$CHF=CH_2$
$CH_2=CH_2$
$CFCl=CH_2$
$CCl_2=CH_2$
$CHCl=CH_2$
$CHBr=CH_2$ and $CH_2=C-(CF_3)CH_3$ to give rubbery high polymers. Other examples of fluorocarbon elastomers useful in the invention include the terpolymers of vinylidene fluoride, vinyl chloride and chlorotrifluoroethylene described by Honn et al., U.S. Patent 2,915,506, December 1, 1959; and the copolymers of trifluoronitrosomethane with $CF_2=CF_2$
$CH_2=CF_2$
$CF_2=CFCl$
$CF_2=CCl_2$
$C_6H_5CH=CH_2$
$CH_2=C(CH_3)CO_2C_4H_9$ and $CF_2=CHF$ described by Crawford, Chem. and Eng. News, April 18, 1960, page 107. In the practice of our invention the preferred fluorocarbon elastomers are those derived at least in part from compounds containing a substituent selected from hydrogen and nitroso.

In accordance with the invention a fluorocarbon elastomer is reacted with an alkali metal salt (lithium, sodium or potassium) of maleimide. In the resulting product some of the fluorine atoms are replaced by maleimido groups, so that the polymer chains are composed of recurring fluorocarbon groups and maleimidocarbon groups.

The resulting product is characterized by the ability to be cured or cross-linked simply by heating. The cured products are especially valuable because they do not continue to evolve hydrogen fluoride as do fluorocarbon rubbers vulcanized by the prior art. Further, films of the modified fluorocarbon rubbers of the invention can be cured while exposed to air which is not possible with prior art vulcanizing methods.

The modifying agents employed in the invention may be prepared before addition to the rubber; but, in many cases, they may also be prepared in the rubber or in a solution of the rubber.

The amount of modifying agent may be varied so as to replace from only a small amount of the fluorine up to nearly all of it. From about 2 parts to 10 parts of modifying agent per 100 parts by weight of elastomer is the preferred amount to produce the most useful results.

The modification reaction is effected by heating the elastomer and the modifying agent in mutual solution in any common solvent that is substantially inert under the conditions of the reaction. Among the particularly suitable solvents may be mentioned ketones, hydrocarbons, halogenated hydrocarbons, alcohols, and the like, and mixtures of such solvents. To effect the reaction the solution is conveniently heated at or below the reflux temperature of the solution. Reaction temperatures of 50°–100° C. are usual. Ordinarily a significant amount of reaction will take place within ½ hour or so, and ordinarily there is no proportionate added advantage in carrying out the reaction for more than about 10 hours.

If prepared in solution the reaction product may be isolated by evaporating the solvent, or by precipitating it with a non-solvent, such as water. The product is found to be a processible, stable rubbery material that may be shaped (e.g. calendered, molded, extruded) in essentially the same manner as the unmodified fluorocarbon elastomer. The product is stable in solution and in bulk.

The product can be cured or cross-linked simply by heating it to an elevated temperature, with or without prior addition of conventional compounding ingredients such as acid acceptors (e.g., magnesium oxide, furnace carbon black), preferably while exposed to air or, less preferably, in an inert atmosphere. The time and temperature conditions employed for such cure are generally inversely related and will vary widely in practice, depending on such factors as the degree of cure desired, the amount of modifying agents employed, the extent of modification, the size of the article, the character of the heating device, the presence or absence of air, etc. In many cases particularly useful results are obtained by heating for a period of from about ½ to 10 hours at a temperature of from about 250° to 400° F. (121° to 204° C.)

The modified fluorocarbon elastomer of the invention need not be isolated as such but may, for example, be deposited as a solution directly upon a non-adherent casting surface, or on a supporting backing such as fabric or the like, and may then be cured in situ.

Expanded products may be made by compounding with a blowing agent prior to cure.

The cured products of the invention are useful in making fuel cells, protection clothing such as gloves or boots, and the like.

The invention is further illustrated but not limited by the example which follows:

*Example*

To 12.5 grams of Viton A–HV (copolymer of vinylidene fluoride and hexafluoropropene in mole ratio of 4:1) dissolved in 250 ml. of 2-butanone (the non-aqueous pH being adjusted to neutral) was slowly added 145 ml. of an ethanol solution containing 0.032 mole (3.81 grams) of dissolved sodium maleimide. This is a loading of approximately 25 parts of maleimide ion per 100 grams Viton A–HV. The solution was refluxed 1 hour at 74° C., then cooled, and a film was cast on glass from one portion. The polymer from the remainder of the solution was precipitated by pouring into water, purified by redissolving it in 2-butanone, then reprecipitated by water (3 times), and dried. A sample of the purified polymer analyzed as follows: 61% F, 36.2% C, and 2.6% H. This corresponds to 11.5% of maleimido groups by weight, or to 13 grams of combined maleimide per 100 grams of Viton A–HV (52% yield).

The cast film from the reaction mixture was found to be tightly cross-linked (i.e., insoluble in hot 2-butanone) after being heated 30 min. at 400° F., (204° C.) in an air oven.

Having thus described our invention, what we claim and desire to protect by Letters Patent is:

1. A method comprising heating 100 parts by weight of a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso and from 2 to 10 parts by weight of an alkali metal salt of maleimide in mutual solution in a solvent therefor at a temperature up to reflux temperature for ½ to 10 hours whereby there is produced a 2-butanone-soluble elastomer which is capable of being cured by heating at a temperature of 121° to 204° C. for ½ to 10 hours.

2. A method of modifying a fluorocarbon elastomer which is a copolymer of a monomer selected from the group consisting of vinylidene fluoride and nitrosotrifluoromethane with a monomer selected from the group consisting of chlorotrifluoroethylene and hexafluoropropene, which comprises mixing 100 parts by weight of said elastomer with 2 to 10 parts by weight of an alkali metal salt of maleimide in a mutual inert solvent, and heating the mixture at a temperature of 50° to 100° C. for ½ to 10 hours whereby there is produced a 2-butanone-soluble elastomer which is capable of being cured by heating at a temperature of 121° to 204° C. for ½ to 10 hours.

3. A method as in claim 2 in which the elastomer is a vinylidene fluoride-hexafluoropropene copolymer.

4. A method as in claim 2 in which the elastomer is a vinylidene fluoride-chlorotrifluoroethylene copolymer.

5. A method of making a cured, shaped article from a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, comprising mixing 100 parts by weight of said elyastomer with from 2 to 10 parts by weight of an alkali metal salt of maleimide in a mutual inert solvent, heating the mixture at a temperature of 50° to 100° C. for ½ to 10 hours to provide an uncured reaction product of said elastomer and salt, shaping the uncured reaction product into a desired form, and thereafter curing the reaction product to a state in which it is insoluble in hot 2-butanone by heating it at a temperature of 121°–204° C. for ½ to 10 hours.

6. A method of making a cured, shaped article from a fluorocarbon elastomer which is a copolymer of a monomer selected from the group consisting of vinylidene fluoride and nitrosotrifluoromethane with a monomer selected from the group consisting of chlorotrifluoroethylene and hexafluoropropene, which comprises mixing 100 parts by weight of said elastomer with 2 to 10 parts by weight of an alkali metal salt of maleimide in a mutual inert solvent, heating the mixture at a temperature of 50° to 100° C. for ½ to 10 hours to provide an uncured reaction product of said elastomer and salt, shaping the uncured reaction product into a desired form, and thereafter curing the reaction product to a state in which it is insoluble in hot 2-butanone by heating it at a temperature of 121°–204° C. for ½ to 10 hours.

7. A reaction product of 100 parts by weight of a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, with from 2 to 10 parts by weight of an alkali metal salt of maleimide, the said reaction product being soluble in 2-butanone.

References Cited by the Examiner

UNITED STATES PATENTS 2,958,672  11/60  Goldberg _____ 260—78
3,153,014  10/64  Fletcher et al. _____ 260—78

WILLIAM H. SHORT, *Primary Examiner.*

LOUISE P. QUAST, LEON J. BERCOVITZ, *Examiners.*